United States Patent
Krieg et al.

(10) Patent No.: US 9,208,907 B2
(45) Date of Patent: Dec. 8, 2015

(54) METHOD OF VALIDATING NUCLEAR REACTOR IN-VESSEL DETECTOR OUTPUT SIGNALS

(71) Applicant: WESTINGHOUSE ELECTRIC COMPANY LLC, Cranberry Township, PA (US)

(72) Inventors: David J. Krieg, Pittsburgh, PA (US); William A. Boyd, Carnegie, PA (US); Nicholas A. Bachmann, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 534 days.

(21) Appl. No.: 13/771,115

(22) Filed: Feb. 20, 2013

(65) Prior Publication Data

US 2014/0133620 A1     May 15, 2014

Related U.S. Application Data

(60) Provisional application No. 61/725,591, filed on Nov. 13, 2012.

(51) Int. Cl.
*G21C 17/00*      (2006.01)
*G21C 17/108*     (2006.01)
*G21D 3/00*       (2006.01)

(52) U.S. Cl.
CPC .............. *G21C 17/108* (2013.01); *G21D 3/001* (2013.01); *Y02E 30/40* (2013.01)

(58) Field of Classification Search
CPC ..... G21C 17/00; G21C 17/104; G21C 17/108; G21C 17/06; G21C 7/36; G01T 1/17
USPC .................................. 376/245, 254, 258, 259
See application file for complete search history.

(56) References Cited

U.S. PATENT DOCUMENTS 4,701,297 A     10/1987 Pekarek
5,078,957 A      1/1992 Tower et al.
(Continued)

OTHER PUBLICATIONS

Boyd, W.A. and Miller, R.W., The BEACON on-line core monitoring system. Functional upgrades and appplications, Proceedings of a Specialist meeting, 1997, pp. 115-124. ISBN 92-64-15616-X.*
(Continued)

*Primary Examiner* — Jack W Keith
*Assistant Examiner* — Sharon M Davis
(74) *Attorney, Agent, or Firm* — Joseph C. Spadacene; Westinghouse Electric Company LLC

(57) ABSTRACT

A method to perform signal validation for either reactor fixed incore detectors and/or core exit thermocouples to enhance core monitoring systems. The method uses a combination of both measured sensor signals and expected signal responses to develop a ratio of measured to expected signals. The ratios are evaluated by determining the expected ratios for each detector based on the behavior of the remaining collection of detectors, taking into account the geometry/location of the other detectors. The method also provides for automatic removal of invalid detectors from the core power distribution determination if sufficient detectors remain on line to adequately characterize the core's power distribution.

9 Claims, 5 Drawing Sheets

(56) References Cited

U.S. PATENT DOCUMENTS

| | | | |
|---|---|---|---|
| 5,229,066 | A | 7/1993 | Impink, Jr. et al. |
| 5,297,174 | A | 3/1994 | Impink, Jr. et al. |
| 5,373,539 | A | 12/1994 | Impink, Jr. et al. |
| 5,386,441 | A | 1/1995 | Erin et al. |
| 5,646,410 | A | 7/1997 | Barat et al. |
| 5,745,538 | A | 4/1998 | Heibel |
| 5,787,138 | A | 7/1998 | Ocieczek et al. |
| 6,061,412 | A | 5/2000 | Stucker et al. |
| 6,236,698 | B1 * | 5/2001 | Hirukawa et al. ............ 376/255 |
| 6,493,412 | B1 | 12/2002 | Boyd et al. |
| 7,180,055 | B1 | 2/2007 | Kallenbach et al. |
| 2003/0171894 | A1 | 9/2003 | Giovanni Battista Mancini et al. |
| 2008/0208526 | A1 * | 8/2008 | Thibaux et al. ............... 702/176 |
| 2009/0257546 | A1 | 10/2009 | Lu et al. |
| 2011/0002432 | A1 | 1/2011 | Heibel et al. |
| 2011/0268239 | A1 | 11/2011 | Krieg |
| 2012/0177166 | A1 | 7/2012 | Seidel et al. |
| 2012/0177167 | A1 | 7/2012 | Heibel et al. |

OTHER PUBLICATIONS

Venkatasubramanian et al., A Review of process fault detection and diagnosois Part I: Quantitative model-based methods, Computers and Chemical Engineering 27, 2003, pp. 293-311.*

Smidts, C. and Devooght, J., Probabilistic Reactor Dynamics-II: A Monte Carlo Study of a Fast Reactor Transient, Nuclear Science and Engineering, 111, 1992, pp. 241-256.*

International Search Report and Written Opinion of the International Searching Authority for PCT/US2013/066066 dated Aug. 20, 2014 (Forms PCT/ISA/220, PCT/ISA/210, PCT/ISA/237).

Westinghouse Electric Company, "Nuclear Fuel/Fuel Engineering BEACON TM Core Monitoring Software," Feb. 2011, 2 pages.

International Preliminary Report on Patentability for PCT/US2013/066066 dated May 28, 2015 (Forms PCT/IB/326, PCT/IB/373, and PCT/ISA/237).

* cited by examiner

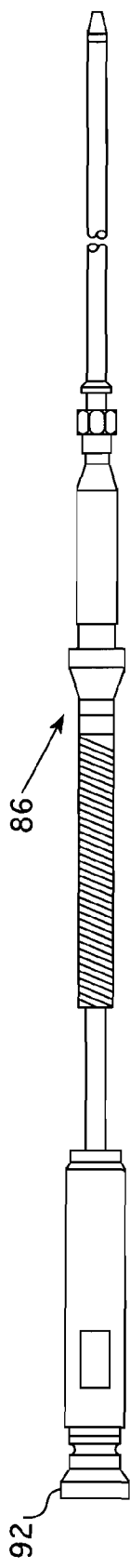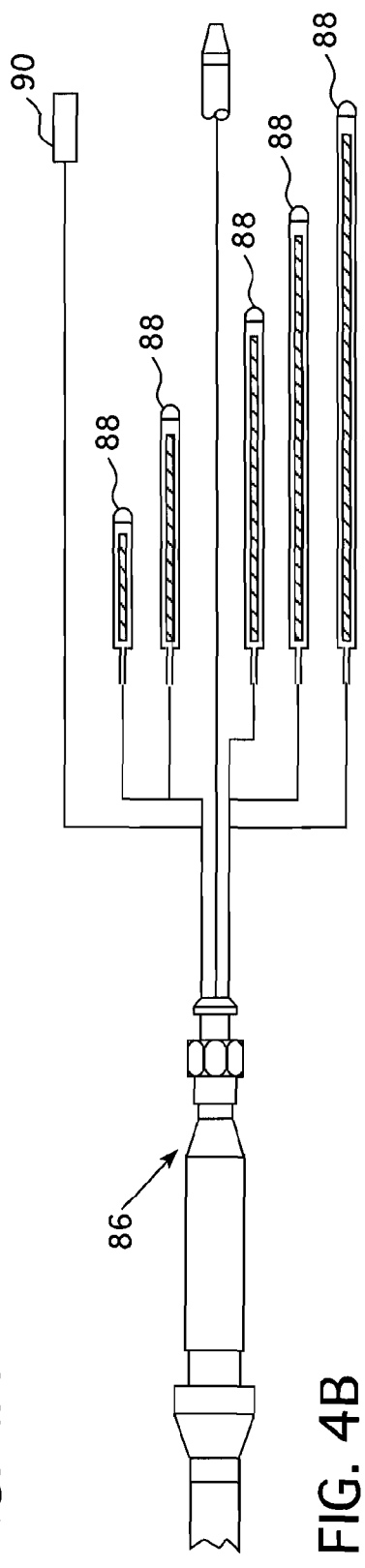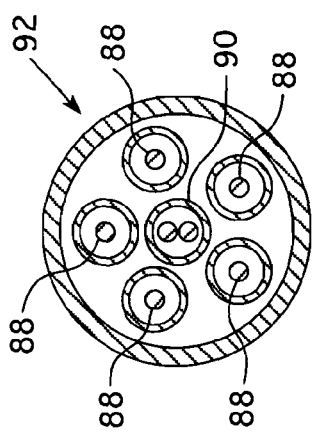
FIG. 4A
FIG. 4B
FIG. 4C

METHOD OF VALIDATING NUCLEAR REACTOR IN-VESSEL DETECTOR OUTPUT SIGNALS

CROSS REFERENCE TO RELATED APPLICATION

This application claims priority under 35 U.S.C. §119(e) to U.S. Provisional Patent Application Ser. No. 61/725,591, filed Nov. 13, 2012 entitled, A METHOD FOR INCORE DETECTOR AND CORE EXIT THERMOCOUPLE SIGNAL VALIDATION.

BACKGROUND

1. Field

This invention pertains generally to a method of validating nuclear reactor in-vessel detectors and more particularly to such a method for validating the output signals of fixed incore flux detectors and core exit thermocouples.

2. Related Art

A pressurized water reactor has a large number of elongated fuel assemblies mounted within an upright reactor vessel. Pressurized coolant is circulated through the fuel assemblies to absorb heat generated by nuclear reactions in fissionable material contained in the fuel assemblies. An ex-core detector system mounted outside the reactor vessel provides a measure of the average power generated by the fuel assemblies. However, it is also important to note the distribution of power through the core to assure that operating limits are not exceeded. The power distribution is affected by a number of factors, such as for instance, the degree of insertion of control rods into the fuel assemblies.

Systems have been developed to determine the power distribution in a pressurized water reactor. One system known as the BEACON™ core monitoring system, available for licensing from the Westinghouse Electric Company LLC, Cranberry Township, Pa., employs a set of coupled, yet independent, computer software programs, which execute concurrently on one or more engineering work stations to generate on-line three-dimensional power distributions in the reactor core. The BEACON™ system uses an incore flux map together with a three-dimensional analysis to yield a continuously measured three-dimensional power distribution. The functions performed by the BEACON™ system include core monitoring and core analysis, including predictive functions such as online shutdown margin evaluations, estimated critical condition calculations and load maneuver simulation.

The flux maps in many nuclear plants are generated by running movable detectors through instrumentation thimbles in some, but not all of the fuel assemblies. In other plants, fixed incore detectors are positioned within the instrumentation thimbles and provide incrementally spaced axial flux readings at radially distributed locations throughout the core. The fixed incore detectors continuously provide a signal output that is used to map the core three-dimensional power distribution. The power produced in individual fuel assemblies can also be determined by the change in enthalpy of the coolant as it passes through the assembly. Enthalpy, in turn, is a function of the temperature rise over the fuel assembly, the pressure of the coolant and certain properties of the coolant. The coolant pressure remains fairly constant, but in any event, is a measured quantity, and the properties of the coolant are known. The rise in temperature is measured by inlet temperature sensors which measure the temperature of the coolant as it circulates back to the reactor core. Average inlet coolant temperature to the fuel assemblies can be measured accurately. Some, but not all, of the fuel assemblies are fitted with exit thermocouples. The enthalpy change in the instrumented assemblies can be calculated by measuring the temperature rise over the fuel assembly. If the coolant flow rate of the assembly is accurately known, then the power produced in the assembly is accurately obtained. A fuel assembly in a pressurized water reactor does not have an enclosure channel like boiling water reactors, which prevents the coolant from cross flowing among the neighboring assemblies.

The effect of the cross flow is characterized by the mixing factor which is defined as the ratio of the measured assembly power and the power determined from the measured enthalpy rise by the thermocouple. These mixing factors depend on the thermocouple location in the core and the reactor power level. These measured mixing factors are used to update the three-dimensional analytical nodal model of the power distribution. Power distribution uncertainties are evaluated by generating a standard deviation of the mixing factors from each thermocouple. These uncertainties are applied by the BEACON™ system to the measured power results.

Thus, the BEACON™ core monitoring system provides continuous monitoring of the reactor core three-dimensional measured power distribution and allows for an accurate assessment of available margin to various limits, e.g., peak linear heat rate, nuclear hot channel factor, and Departure from Nucleate Boiling Ratio (DNBR). To perform this monitoring function, the BEACON™ system relies on the accuracy and reliability of the self-powered neutron incore detectors and/or core exit thermocouples as a source of measurement information. There is no method currently within the BEACON™ system to automatically detect if one of these instruments is failing, failed, or providing an invalid signal. However, an invalid detector signal can cause inaccurate operating margins, which can lead to nonconformance of technical specification surveillance, unnecessary operation limitations on the plant, and can be time-consuming to diagnose the cause of the problem.

Accordingly, it is an object of this invention to provide a method that automatically goes through a series of evaluations on the data from each detector to determine if the detector output is valid.

It is a further object of this invention to automatically remove individual detector outputs from the core calculation considerations once the outputs have been verified as being invalid.

Additionally, it is an object of this invention to assure that detector outputs are not removed from consideration in the core calculations until it is verified that an acceptable number of remaining detector valid outputs are available to safely disregard the invalid detector outputs.

SUMMARY

These and other objects are achieved by a method of validating a nuclear reactor instrumentation output signal for a plurality of in-reactor detectors having a plurality of detector elements radially spaced at approximately the same axial elevation relative to a nuclear reactor core, with each of the detector elements having an output signal indicative of a measured reactor operating parameter at a radial and axial location at which the detector element is located. The method includes the step of running a predictive calculation to generate an anticipated output of three or more of the detector elements at approximately the same axial elevation based on a current operating state of the reactor. The method then takes a ratio of an actual signal respectively generated by the three or more detector elements at substantially the same axial elevation, to the corresponding anticipated output. Then the method generates an expected range of the ratios of the actual signals generated to the corresponding anticipated outputs for a number of adverse plant operating conditions. A determination is then made if the ratio of the actual signal generated by any of the three or more detector elements at substantially the same axial elevation is outside the range of ratios. If the ratio of the actual signal generated by any of the three or more of the detector elements is outside the range of ratios the method then spline fits the ratios of the detector elements at substantially the same elevation that are within the range of ratios and identifies whether any detector element who has a ratio outside the range has a ratio that is similar to the spline fit at the corresponding radial location. If the ratio that is outside the range of ratios is not similar to the spline fit ratio at the corresponding location, then the method removes the detector element that has a ratio outside the range that is also not similar to the spline fit ratio from the reactor core calculation considerations.

Preferably, the step of generating an expected range of the ratios is determined by an offline Monte Carlo analysis and the adverse operation conditions include one or more of dropped rods and power level mismatches. The number of adverse operating conditions takes into consideration random detector depletion and sensor signal noise.

In one embodiment, the method includes the step of normalizing the range of ratios to take into account the difference in total measured signal and total predictive signal. Preferably, before a suspect detector is removed from the reactor core calculations there must be a user specified number of validated detectors within a given area of the suspect detector. Furthermore, in another embodiment, before a suspect detector is removed from reactor core calculations, there must be a predetermined fraction of a plurality of detector elements at approximately the same axial elevation whose signals have been validated or are otherwise known to be working.

BRIEF DESCRIPTION OF THE DRAWINGS

A further understanding of the invention can be gained from the following description of the preferred embodiments when read in conjunction with the accompanying drawings in which:

FIG. 4A is a plan view of an incore instrument thimble assembly that can fit within the central instrument thimble of the fuel assembly shown in FIG. 3;

FIG. 4B is a schematic view of the interior of the forward sheath of the incore instrument thimble assembly of FIG. 4A;

FIG. 4C is a sectional view of the electrical connector at the rear end of the incore instrument thimble assembly of FIG. 4A.

DESCRIPTION OF THE PREFERRED EMBODIMENT

The primary side of nuclear reactor power generating systems which are cooled with water under pressure comprises an enclosed circuit which is isolated from and in heat exchange relationship with a secondary circuit for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

Figure 1:
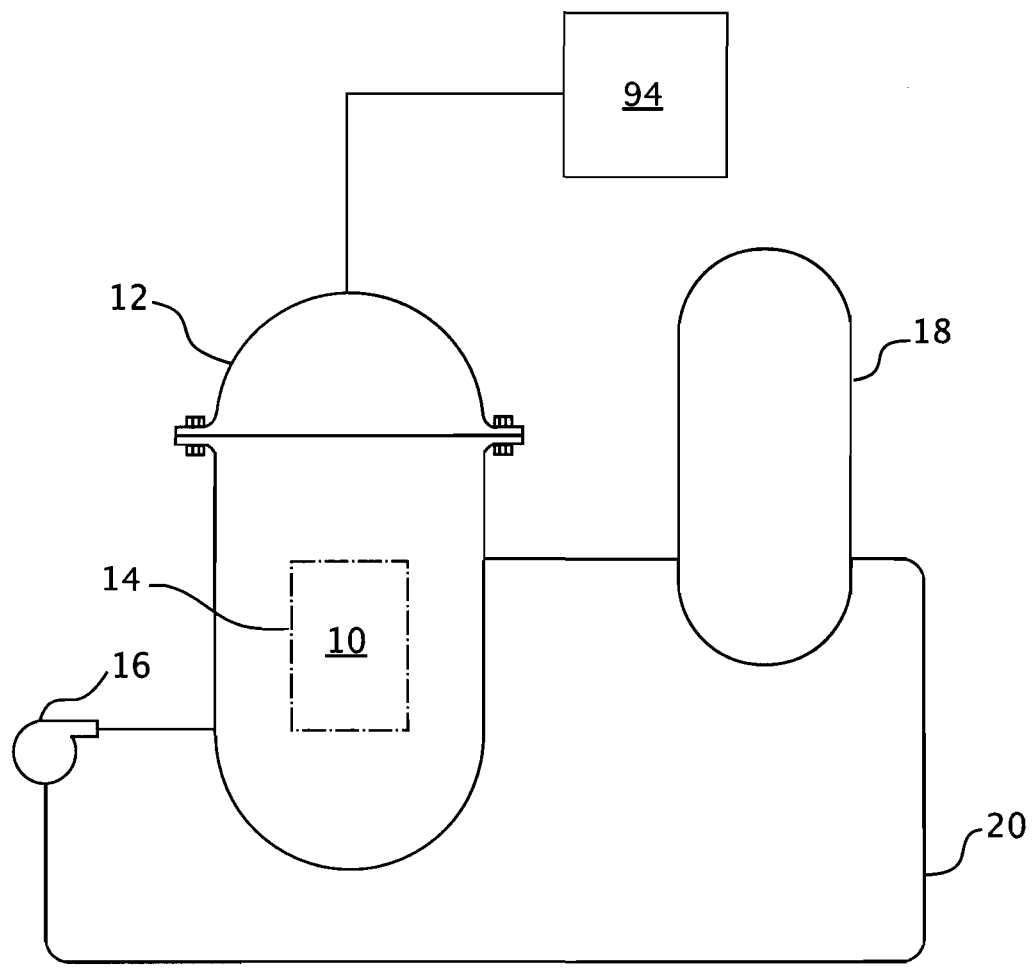
FIG. 1 is a simplified schematic of a nuclear reactor system to which the embodiments described hereafter can be applied.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water or borated water is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

Figure 2:
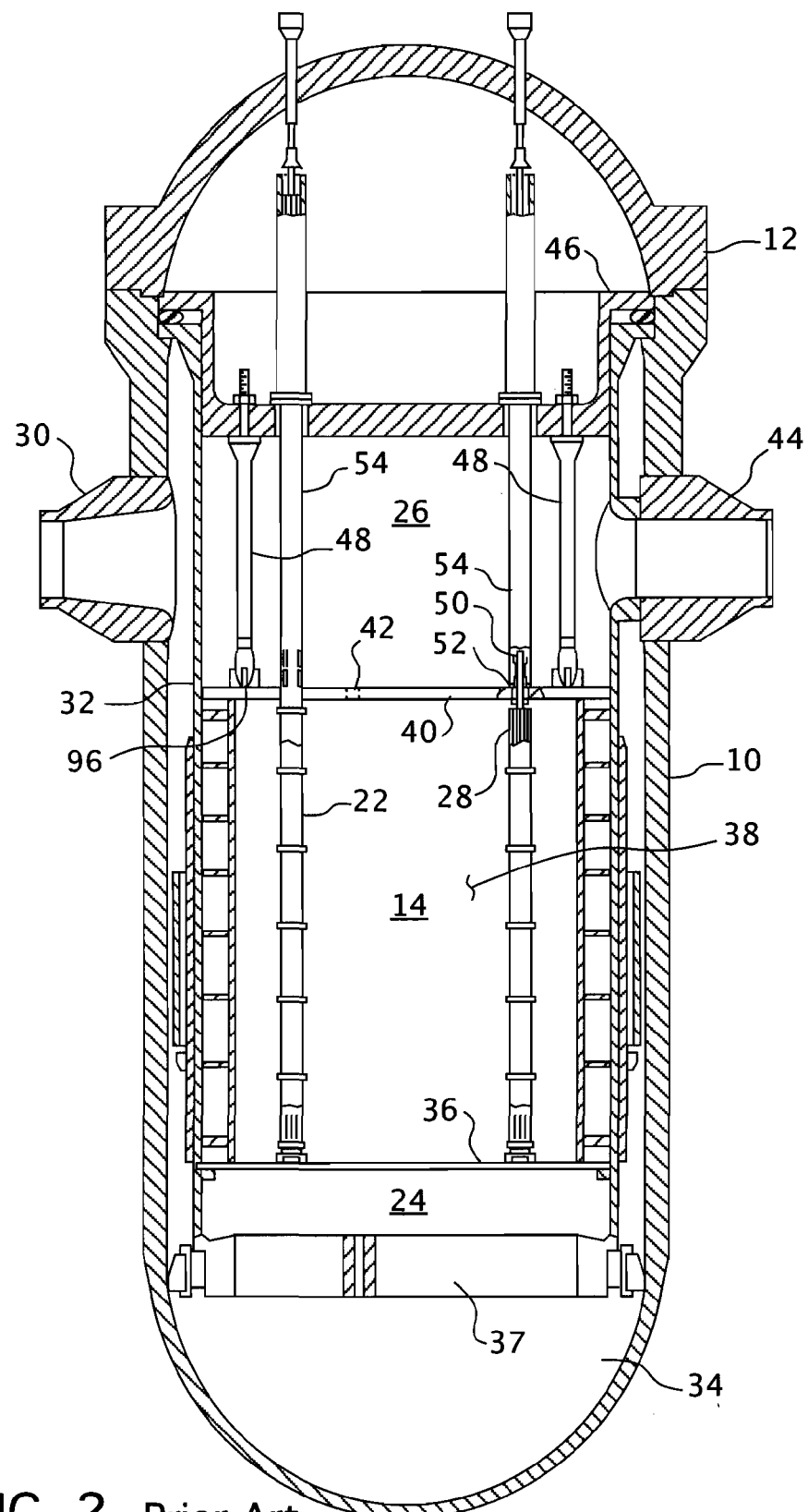
FIG. 2 is an elevational view, partially in section, of a nuclear reactor vessel and internal components to which the embodiments described hereafter can be applied.

An exemplary reactor design is shown in more detail in FIG. 2. In addition to the core 14, comprised of a plurality of parallel, vertical co-extending fuel assemblies 22, for the purpose of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel through one or more inlet nozzles 30, flows down through an annulus between the reactor vessel and the core barrel 32, is turned 180° in a lower plenum 34, passes upwardly to a lower support plate 37 and lower core plate 36 upon which the fuel assemblies are seated and through and about the fuel assemblies 22. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly moveable control rods 28, which typically include a drive shaft 50 and a spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

Figure 3:
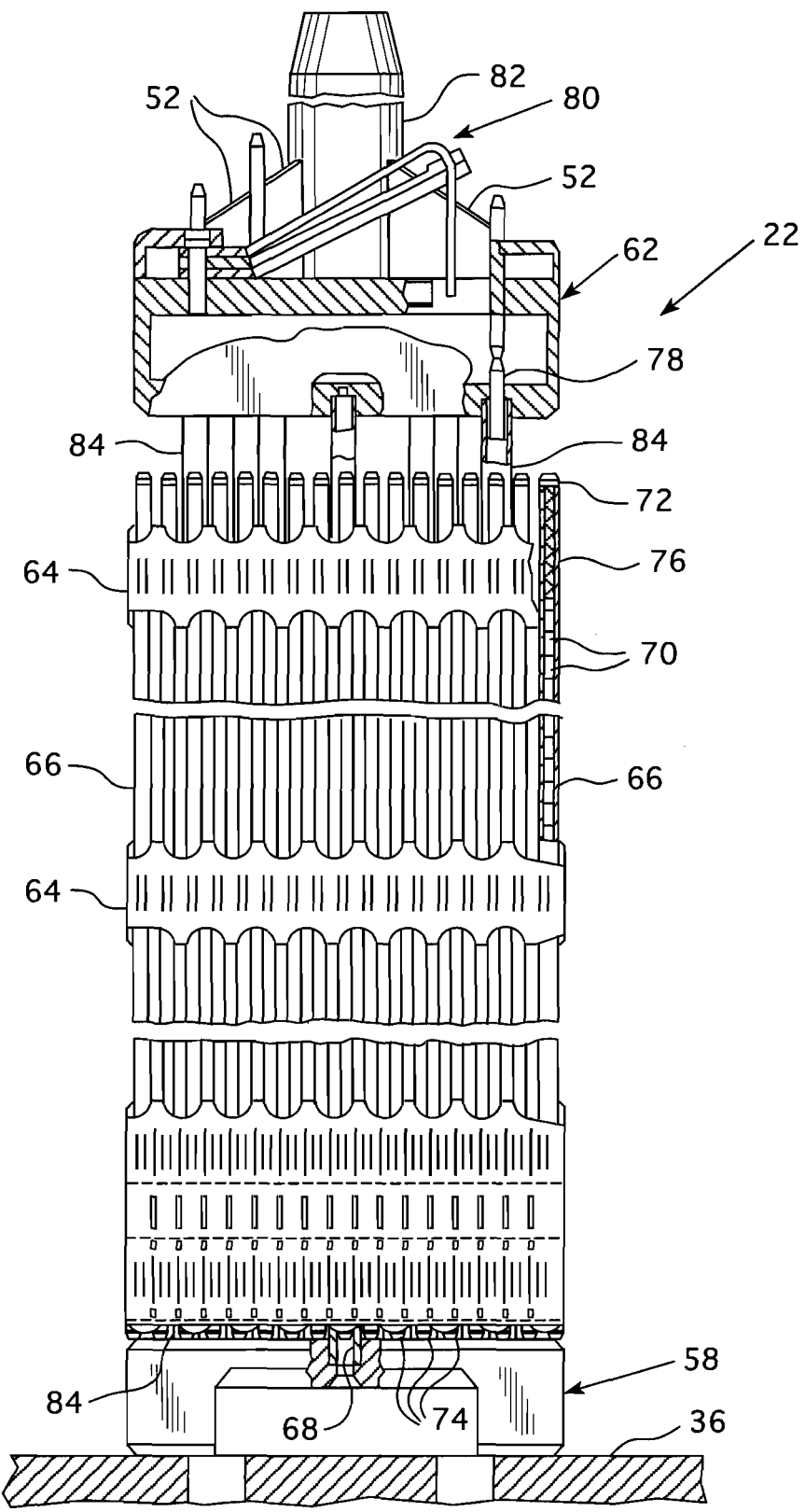
FIG. 3 is an elevational view, partially in section of the fuel assembly illustrated in vertically shortened form, with parts broken away for clarity.

FIG. 3 is an elevational view, represented in vertically shortened form, of a fuel assembly being generally designated by reference character 22. The fuel assembly 22 is the type used in a pressurized water reactor and has a structural skeleton which, at its lower end, includes a bottom nozzle 58. The bottom nozzle 58 supports the fuel assembly 22 on the lower core plate 36 in the core region of the nuclear reactor. In addition to the bottom nozzle 58, the structural skeleton of the fuel assembly 22 also includes a top nozzle 62 at its upper end and a number of guide tubes or thimbles 84 which align with the guide tubes 54 in the upper internals. The guide tubes or thimbles 84 extend longitudinally between the bottom and top nozzles 58 and 62 and at opposite ends are rigidly attached thereto. The fuel assembly 22 further includes a plurality of transverse grids 64 axially spaced along and mounted to the guide thimbles 84 and an organized array of elongated fuel rods 66 transversely spaced and supported by the grids 64. Also, the assembly as shown in FIG. 3, has an instrumentation tube 68 located in the center thereof that extends between and is captured by the bottom and top nozzles 58 and 62. With such an arrangement of parts, fuel assembly forms an integral unit capable of being conveniently handled without damaging the assembly of parts.

As mentioned above, the fuel rods 66 in the array thereof in the assembly 22 are held in a spaced relationship with one another by the grids 64 spaced along the fuel assembly length. Each fuel rod 66 includes a plurality of nuclear fuel pellets 70 and is closed at its opposite end by upper and lower end plugs 72 and 74. pellets 70 are maintained in a stack by a plenum spring 76 disposed between the upper end plugs 72 and the top of the pellets stack. The fuel pellets 70, composed of fissile material, are responsible for creating the reactive power of the nuclear reactor. The cladding which supports the pellets functions as a barrier to prevent the fission byproducts from entering the coolant and further contaminating the reactor system.

To control the fission process, a number of control rods 78 are reciprocally movable in the guide thimbles 84 located at predetermined positions in the fuel assembly 22. Specifically, a rod cluster control mechanism 80, positioned above the top nozzle 62, supports a plurality of the control rods 78. The control mechanism has an internally threaded cylindrical hub member 82 with a plurality of radially extending flukes or arms 52 that form the spider previously noted with regard to FIG. 2. Each arm 52 is interconnected to the control rods 78 such that the control rod mechanism 80 is operable to move the control rods vertically in the guide thimbles 84 to thereby control the fission process in the fuel assembly 22, under the motive power of a control rod guide shaft 50 which is coupled to the control rod hub 82 all in a well known manner.

As previously mentioned, some nuclear plants employ fixed incore neutron detectors within the instrument thimbles 68 within the fuel assemblies 22. This type of sensor has the ability to measure the radioactivity within the core at a number of axial elevations. These sensors are used to measure the radial and axial distribution of power inside the reactor core. This power distribution measurement information is used to determine whether the reactor is operating within the nuclear design power distribution limits. The typical incore sensor used to perform this measurement function produces an electric current that is proportional to the amount of fission occurring around it. This type of sensor does not require an outside source of electrical power to produce the current and is commonly referred to as a self-powered detector. One type of self powered radiation detector is described in U.S. Pat. No. 5,745,538, issued Apr. 28, 1998, and assigned to the Assignee of this invention. A neutron sensitive material such as rhodium, vanadium, cobalt, platinum, or other similar characteristic material is employed for the emitter element and emits electrons in response to neutron irradiation. Typically, the self-powered detectors are grouped within incore instrumentation thimble assemblies. A representative incore instrumentation thimble assembly 86 is shown in FIGS. 4A, 4B and 4C. The signal level generated by the neutron sensitive emitter element is low; however, a neutron sensitive emitter element provides an adequate signal without complex and expensive signal processors. The incore instrumentation thimble assemblies may also include a thermocouple 90 for measuring the coolant temperature existing within the fuel assemblies. The electrical signal output from the self-powered detector elements and the thermocouple in each incore instrumentation thimble assembly in the reactor core is collected at the electrical connector 92 and sent to a location well away from the reactor for final processing and use in producing the measured core power distribution. Thermocouples are also located at the lower end of the support columns 48 to provide a coolant core exit temperature reading at selected locations.

As previously mentioned, the BEACON™ core monitoring system figuratively illustrated in FIG. 1 in block form and designated by reference character 94, provides continuous monitoring of the reactor core three-dimensional measured power distribution and allows for an accurate assessment of available margins to various safety limits, e.g., peak linear heat rate, nuclear hot channel factor, DNBR, etc. To perform the monitoring function, the BEACON™ system relies on the accuracy and reliability of the self-powered neutron detectors 86 or the core exit thermocouples 96 situated at the lower ends of the support columns 48 as a source of measurement information. There is no method currently within the BEACON™ system to automatically detect if one of these instruments is failing, failed or providing an invalid signal. An invalid detector signal can cause inaccurate operating margins which can lead to nonconformance of technical specification surveillance, unnecessary operation limitations on the plant, and can be time-consuming to diagnose the cause of the problem, all of which can add to the expense of operation. The method claimed hereafter automatically sequences through a series of evaluations on the data from each detector to determine if the detector data is invalid. It first checks how the data deviates from the surrounding detectors by calculating an expected or predicted value for the detector data to compare to the measured value. If the data fails this check, the method determines if the detector is actually bad, or whether there is an actual deviation from the predicted power shape being measured. If-the latter is true, the surrounding detectors should also see some perturbation. This method takes this possible behavior into account by performing an additional comparison evaluation with data from surrounding detectors at the same axial elevation to confirm if the deviation is real or due to bad data from a failed detector. The detector data is marked as bad if it fails this check.

The method claimed hereafter is applicable to support self-powered fixed incore detectors, such as those using vanadium or rhodium as an emitter material, and is also directly applicable to other fixed incore detectors, such as the core exit thermocouples. In addition, the method claimed hereafter may be employed with moveable incore detector systems as well.

Figure 5:
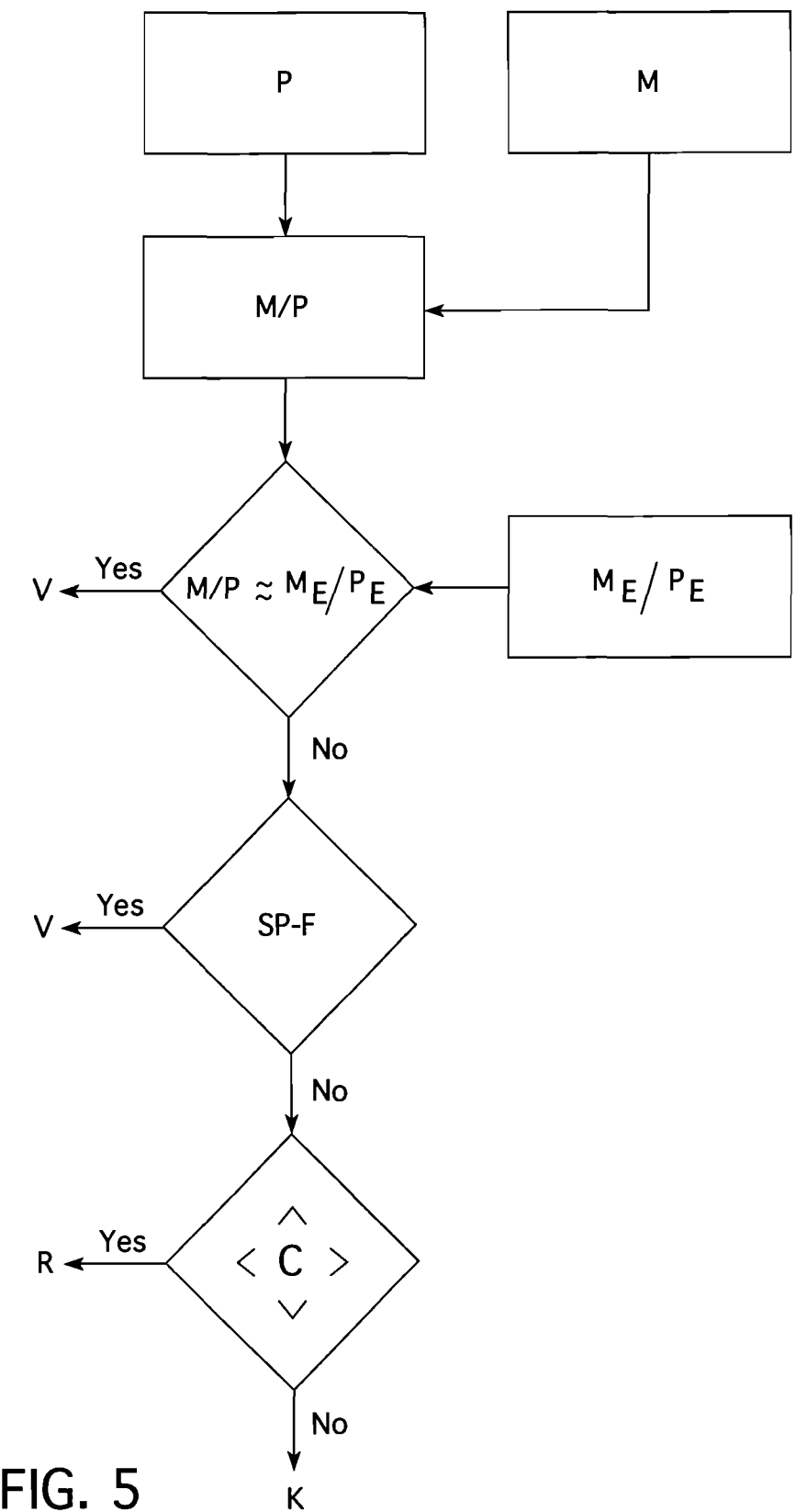
FIG. 5 is a logic flow diagram of the steps of one embodiment of this invention.

In accordance with one embodiment of this invention, which is summarized in a logic flow diagram shown in FIG. 5. The core monitoring system first runs a predictive calculation (P) based on the current state of the reactor, e.g., power level, control rod position, inlet temperatures, etc. This calculation is used to calculate predicted currents for each self-powered fixed incore neutron detector element in the core or temperatures for core exit thermocouples. Each plane of signals (one level of the self-powered fixed incore neutron detector or all of the exit thermocouples) is considered individually. For each detectors in the plane, the ratio of the signal actually measured (M) by the detector to the signal predicted (P) by the software (the ratio M/P) is computed by a code such as the BEACON™ system. These ratios are compared to an expected range ($M_E/P_E$) of signals determined by an offline Monte Carlo analysis that computes signals based on a range of adverse plant operating conditions, e.g., dropped rods, misaligned rods and control banks, power level mismatches, etc., coupled with random detector depletion and noise. The expected range ($M_E/P_E$) is also normalized such that the range takes into account the difference in the total measured signal and the total predicted signal in the core.

To determine if there is an actual deviation from the predicted power shape being measured, the M/P ratios of all other valid detectors on the same level are spline fitted (SP-F) and used to extrapolate a M/P ratio at the suspect detectors' location. If the M/P ratio and the extrapolated M/P ratio from the spline fit are similar within the range of expectation based on the monte carlo analysis, it is concluded that the detector is measuring a true deviation. If they are not, the detector is considered to have failed, and is considered for removal from the core monitoring calculations.

In one embodiment, this method incorporates detection against inadvertently marking a detector as bad. First, there must be a user-specified number of validated detectors within a given area of the suspect detector in order to remove it. Second, there must be a certain. preselected fraction of the full complement of detectors in the same axial level validly working in order to remove a detector. These checks (C), that is to keep (K) or remove (R) a detector, are to protect against the possibility that there are too few detectors close to the suspect detector to see a real perturbation in the power distribution.

Accordingly, the method claimed hereafter provides a convenient means for validating the detector signals to enhance the credibility of core monitoring outputs such as those provided by the BEACON™ system. The method also provides a convenient means for automatically removing detector outputs from the core calculations if the outputs cannot be validated.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of validating a nuclear reactor instrumentation output signal for a plurality of in-reactor detectors having a plurality of detector elements radially spaced at approximately the same axial elevation relative to a nuclear reactor core with each of the detector elements having an output signal indicative of a measured reactor operating parameter at a radial and axial location at which the detector element is located, comprising the steps of:
running a predictive calculation of an anticipated output of three or more of the detector elements at substantially the same axial elevation based on a current operating state of the reactor;
taking a ratio of an actual signal respectively generated by the three or more detector elements at approximately the same axial elevation, to the corresponding anticipated output;
generating an expected range of the ratios of the actual signals generated to the corresponding anticipated outputs for a number of adverse plant operating conditions;
determining if the ratio of the actual signal generated by any of the three or more of the detector elements at substantially the same axial elevation is outside the range of ratios;
spline fitting the ratios of the detector elements at substantially the same axial elevation that are within the range of ratios;
identifying whether any detector element who has a ratio outside the ange has a ratio that is similar to the spline fit ratio at the corresponding radial location; and
removing any detector element that has a ratio outside the range that is not similar to the spline fit ratio from reactor core calculation considerations.

2. The method of claim 1 wherein the step of generating an expected range of the ratios is determined by an offline Monte Carlo analysis.

3. The method of Claim 1 wherein the number of adverse operating conditions include one or more dropped rods.

4. The method of claim 3 wherein the number of adverse operating conditions take into consideration random detector depletion and sensor signal noise.

5. The method of Claim 1 including the step of normalizing the range of ratios to take into account the difference in total measured signal and total predicted signal.

6. The method of claim 1 wherein before a suspect detector is removed from reactor core calculation considerations there must be a user-specified number of validated detectors within a given area of the suspect detector.

7. The method of claim 6 wherein the user-specified number of detectors must be detectors whose signals have been validated.

8. The method of claim 6 wherein before a suspect detector is removed from reactor core calculation considerations there must be a predetermined fraction of the plurality of detector elements at approximately the same axial elevation whose signals have been validated or is otherwise known to be working.

9. The method of claim 1 wherein the number of adverse operating conditions include one or more of misaligned rods, misaligned control banks, and power level mismatches.

* * * * *